(12) United States Patent
Hoover et al.

(10) Patent No.: US 8,123,526 B2
(45) Date of Patent: Feb. 28, 2012

(54) SIMULATOR WITH FORE AND AFT VIDEO DISPLAYS

(76) Inventors: Steven G. Hoover, Bellevue, WA (US); David McLean, Seattle, WA (US); Scott E. Martin, Mercer Island, WA (US); George W. T. Haynes, Kent, WA (US); William J. Halley, Auburn, WA (US)

( * ) Notice: Subject to any disclaimer, the term of this patent is extended or adjusted under 35 U.S.C. 154(b) by 617 days.

(21) Appl. No.: 10/352,321

(22) Filed: Jan. 27, 2003

(65) Prior Publication Data
US 2004/0146840 A1    Jul. 29, 2004

(51) Int. Cl.
*F41G 3/26*    (2006.01)
(52) U.S. Cl. .................... 434/21; 434/11; 463/2; 463/49
(58) Field of Classification Search .............. 434/16–21; 463/2, 49–57
See application file for complete search history.

(56) References Cited

U.S. PATENT DOCUMENTS

| | | | |
|---|---|---|---|
| 4,234,911 A | | 11/1980 | Faith |
| 4,482,325 A | * | 11/1984 | Reimann ......................... 434/21 |
| 4,948,371 A | * | 8/1990 | Hall ................................. 434/21 |
| 5,040,322 A | * | 8/1991 | Iturrey, Jr. ....................... 42/146 |
| 5,119,576 A | * | 6/1992 | Erning ............................. 42/117 |
| 5,569,085 A | * | 10/1996 | Igarashi et al. ................. 463/49 |
| 5,599,187 A | | 2/1997 | Mesiano |
| 5,785,592 A | * | 7/1998 | Jacobsen .......................... 463/7 |
| 5,816,817 A | * | 10/1998 | Tsang et al. ..................... 434/22 |
| 5,842,300 A | | 12/1998 | Cheshelski et al. |
| 5,882,204 A | * | 3/1999 | Iannazo et al. ................ 434/251 |
| 5,947,738 A | * | 9/1999 | Muehle et al. .................. 434/16 |
| 5,980,254 A | * | 11/1999 | Muehle et al. .................. 434/11 |
| 6,126,548 A | * | 10/2000 | Jacobs et al. .................... 463/42 |
| 6,164,018 A | * | 12/2000 | Runge et al. ....................... 52/8 |
| 6,554,706 B2 | * | 4/2003 | Kim et al. ........................ 463/36 |
| 6,569,011 B1 | * | 5/2003 | Lynch et al. ...................... 463/1 |
| 6,579,097 B1 | * | 6/2003 | Sampson et al. ................ 434/21 |
| 6,704,001 B1 | * | 3/2004 | Schena et al. ................. 345/161 |
| 6,755,653 B2 | * | 6/2004 | Varshneya ...................... 434/22 |
| 2001/0022574 A1 | * | 9/2001 | Hwang .......................... 345/156 |
| 2002/0159603 A1 | * | 10/2002 | Hirai et al. ...................... 381/61 |
| 2003/0224333 A1 | * | 12/2003 | Vastvedt ......................... 434/29 |
| 2004/0113887 A1 | * | 6/2004 | Pair et al. ...................... 345/156 |

* cited by examiner

*Primary Examiner* — Kang Hu

(57) ABSTRACT

A simulated real-time environment employs a plurality of computer controlled video projectors and screens at least fore and aft of a participant-trainee to present life-size displays mutually coordinated to represent views of a same environment from a participant's perspective, each screen representing the participant's view looking in a different direction. In response to a participant's actions, the computer seamlessly changes a projected video to match the participant' actions and maintain a scenario consistent between the two screens. The participant uses a light-emitting simulated firearm or his own firearm loaded with a light-emitting cartridge and/or other equipment with which he is familiar, such as a modified or simulated flashlight, taser, chemical spray container or the like, tethered or untethered by a communication wire, to respond to a simulated situation, which response detected and interpreted by the computer to direct a branch in the projected videos and even shoot back a simulated bullet. He may also use verbal commands.

11 Claims, 12 Drawing Sheets

SIMULATOR WITH FORE AND AFT VIDEO DISPLAYS

BACKGROUND OF THE INVENTION

1. Field of the Invention

This invention relates generally to training simulators, and more particularly to a computer-controlled video system employing a plurality of display screens, comprising at least screens in front of and behind a participant-trainee. As the participant interacts with the simulator in response to displayed video images, the computer directs video branching in accordance with situational changes largely dictated by the participant's responses.

2. Prior Art

It is known to have moving life-size images presented by an image generator or projector to which a participant in training reacts. For example, U.S. Pat. No. 4,948,371 discloses a system in which security personnel are presenting moving real-life scenes of situations that may be threatening to personnel or facilities. In accordance with the user's response, the scene changes to present a follow-on scene to which the user must continue to react.

Until now, simulators have been limited to presentation of a participant's forward view, generally. The participant therefore learns to properly react to threat conditions and situations presented in front of him generally but is not trained to consider related events outside of his forward view. His training is not only incomplete but dangerously focused to the exclusion of other threats that could be about him. For example, an air marshal on board an airplane flight must be aware of developments both forward and rearward within the airplane. A terrorist in the front of the airplane may have an accomplice in the rear. Or passengers in the rear may be screaming and moving about in reaction to a terrorist threat elsewhere in the airplane. Or a disruptive passenger or terrorist in one part of the airplane may invoke other passengers to action, perhaps to subdue the disruptive element. Similarly, police and military personnel must learn to be aware of potential threats about them as they address a first issue and must learn to react to a threat from one direction in combination with changing conditions around him. A first threat might instigate other activity behind the police. Police and military personnel should also learn to work in combination with and be mindful of other police or military activity.

It is therefore the primary object of this invention to present a simulator displaying life-sized video images on a plurality of screens, at least including screens fefe and aft of in front of and behind the participant, representing situational challenges to the participant. It is another object that the simulator detect responsive actions from the participant. It is a further object that the images displayed on the several screens change in accordance with the participant's actions to present a continuous change in the situation representative of what might realistically occur if the participant responded to an actual threat in the manner detected by the simulator. It is yet another object that the trainee perceives the simulated condition as near real as possible, interfacing with the simulator using his own weapons and equipment or weapon simulators to respond to the perceived threats presented in the simulator.

SUMMARY OF THE INVENTION

These objects are achieved in a simulated real-time environment comprising a plurality of computer controlled projectors and screens in front of the participant and behind the participant in which a sequence of videos from a data base are seamlessly projected in response to participant actions in a threat situation Different participant responses direct different paths through the available videos. A clarification of terms is helpful. Use of the terms "projector" and "projecting" and "display" and "screen" and similar terms as relates to achieving displays of an image on a screen are meant to include all technologies of displaying an image.

For simplicity in description, the invention is easily understood as applied to two projectors and screens in front of and behind the participant, although it is clear that the same invention applies to a plurality of screens and projectors which in the limit may provide a full circumferential projection around the participant or in multiple rooms. For two screens and projectors, then, a realistic but simulated life-sized environment is presented to the participant in a scenario consistent between the two screens with first and second videos projected on separated first and second screens from coordinated first and second projectors. The participant then reacts to the projected environment with an action, including movement on the floor, weapon use, flashlight use, and talking, that is detected as a first event. A simulator computer then interprets that first event and directs a new video to replace the video being projected at the time in response to the event to maintain situational integrity. The second, or other projector receives notice of the event through the computer and the projected video is changed to maintain a consistent scenario between the two videos.

Similarly, detectors detect subsequent actions of the participant and in response the computer causes videos to change if the computer interprets the participant action as an event requiring a video change to either or both of the projectors to maintain a consistent scenario. This process is repeated until a stopping event occurs, that is, until an event occurs that directs that the simulation should end, such as the resolution of a problem presented to the participant or the constructive debilitation of the participant.

To enhance the environment, in addition to detectors at the screens, various other detectors may be employed to trace the participant's actions. Such may include floor detectors to track his movements, door detectors to record opening or closing of a door, a light switch detector, and any other environmental detector that would provide an indication of the participant's response to the simulated environment.

The participant participates in the simulated environment with what he would have if the environment were not simulated, such as his own pistol, or with a simulated firearm, which may include a dry fire firearm or a recoil round firearm, which firearms may be tethered or untethered with radio frequency communication with the computer. Although actual firearms with live ammunition may be used and detected in the simulator, more typically the firearms employ a light emitting device such as a small laser adapted to fit in the firearm, for example in place of a live cartridge or at the end of the firearm's barrel. The participant may also use any of several such light-emitting devices in simulated weapons or devices, including a simulated taser, a simulated flashlight and a container with simulated chemical spray all in the form of an actual device with which he is already comfortable. In these a light-emitting device is substituted for actual discharge from the weapon, the light from which is detected by one or more detectors at a screen. These devices are all participant input devices adapted to interactively communicate with the training simulator, the input device being configured to emit light under participant control directed at one of said screens, the input device simulating activation of an actual device that might be used in response to an actual threat situation similar to that presented to the participant on a screen. The computer then modifies the video to reflect a discharge of such weapon at the location of detection at the screen. The participant then uses these items to communicate within the simulated environment. Additionally, as in a normal condition, he may use verbal commands or responses to interact with the simulated environment, which also becomes an input that is detected by a provided detector.

In addition to the participant's actions, an operator may introduce an override event into the simulation to initiate or direct a test situation to the participant.

The simulation is a teaching device, therefore a video recorder of the trainee recorded digitally in the computer and a computer record of the simulator video sequences and sensor data is provided that enables the sequence experienced by the participant to be recorded and then reprojected, enabling the participant and his trainer to review and debrief the experience.

Although the above summary appears to presuppose two screens in the same room in front of and behind the participant, one or more screens may similarly be located in different rooms, in which case the computer coordinates in time and situation a first screen in a first room with a second screen in a second room, allowing the participant to move between rooms in the simulation.

DETAILED DESCRIPTION OF THE PREFERRED ENVIRONMENT

Figure 1:
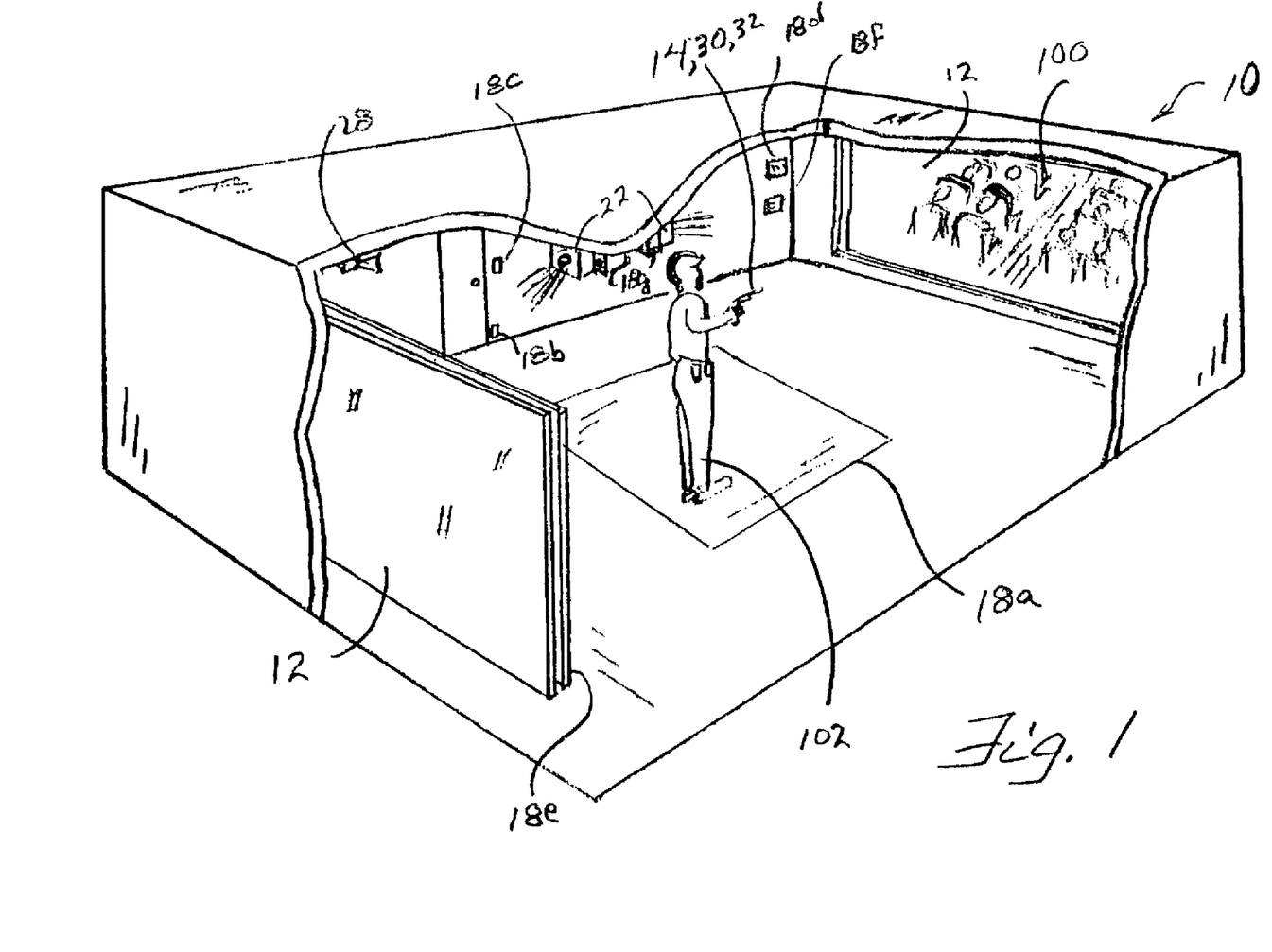
FIG. 1 is a perspective pictorial view of the simulator with a display screen in front of and behind the participant with floor detectors and screen detectors.
Figure 2:
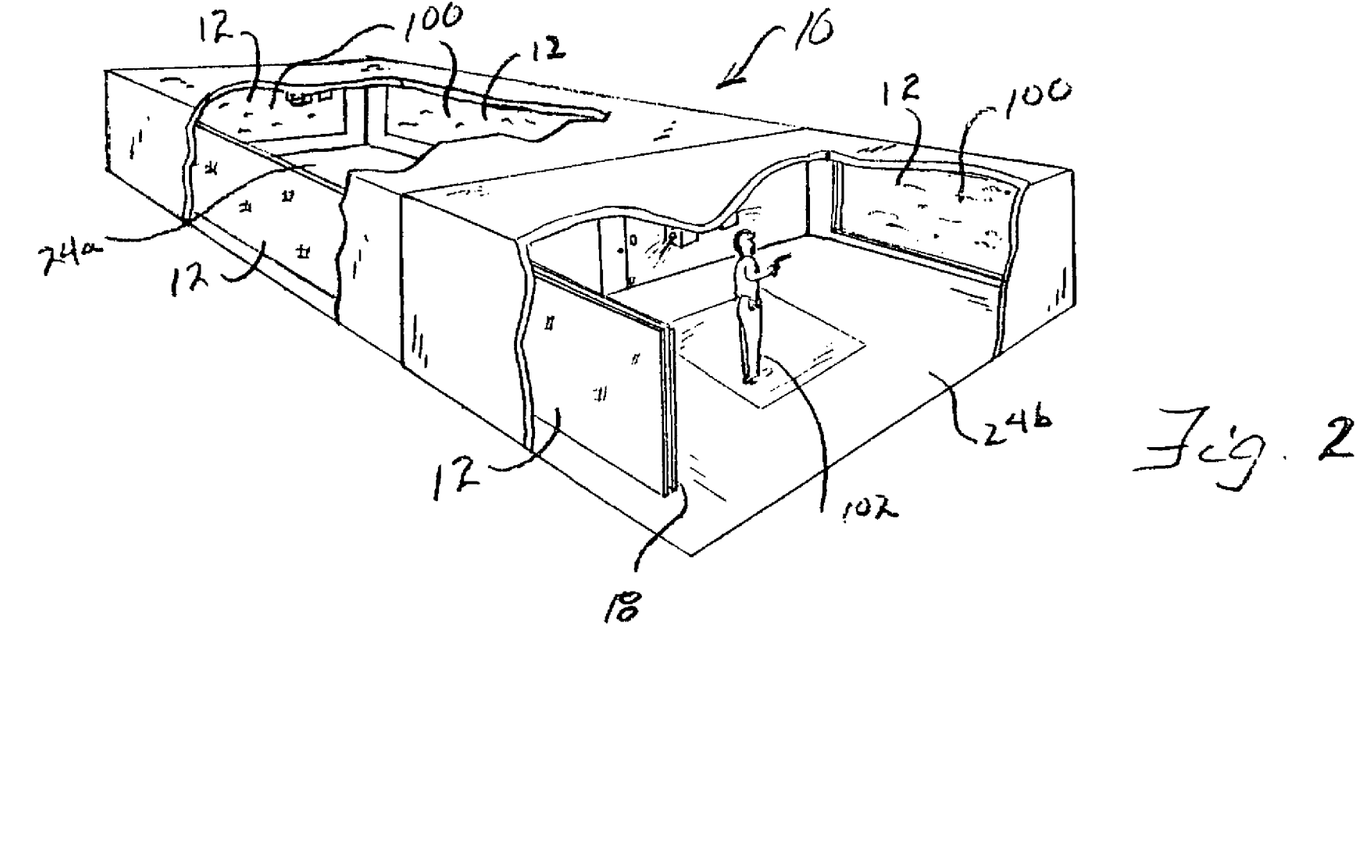
FIG. 2 is a perspective pictorial view of the simulator comprising adjacent rooms each with display screens with a door between the rooms. A detector is represented on the door and a door light switch. The participant is shown employing his own pistol, which may employ live ammunition or a light-emitting cartridge, or a simulated pistol fitted with a light-emitting device to interact with the simulator by firing the pistol at a projected image.
Figure 3:
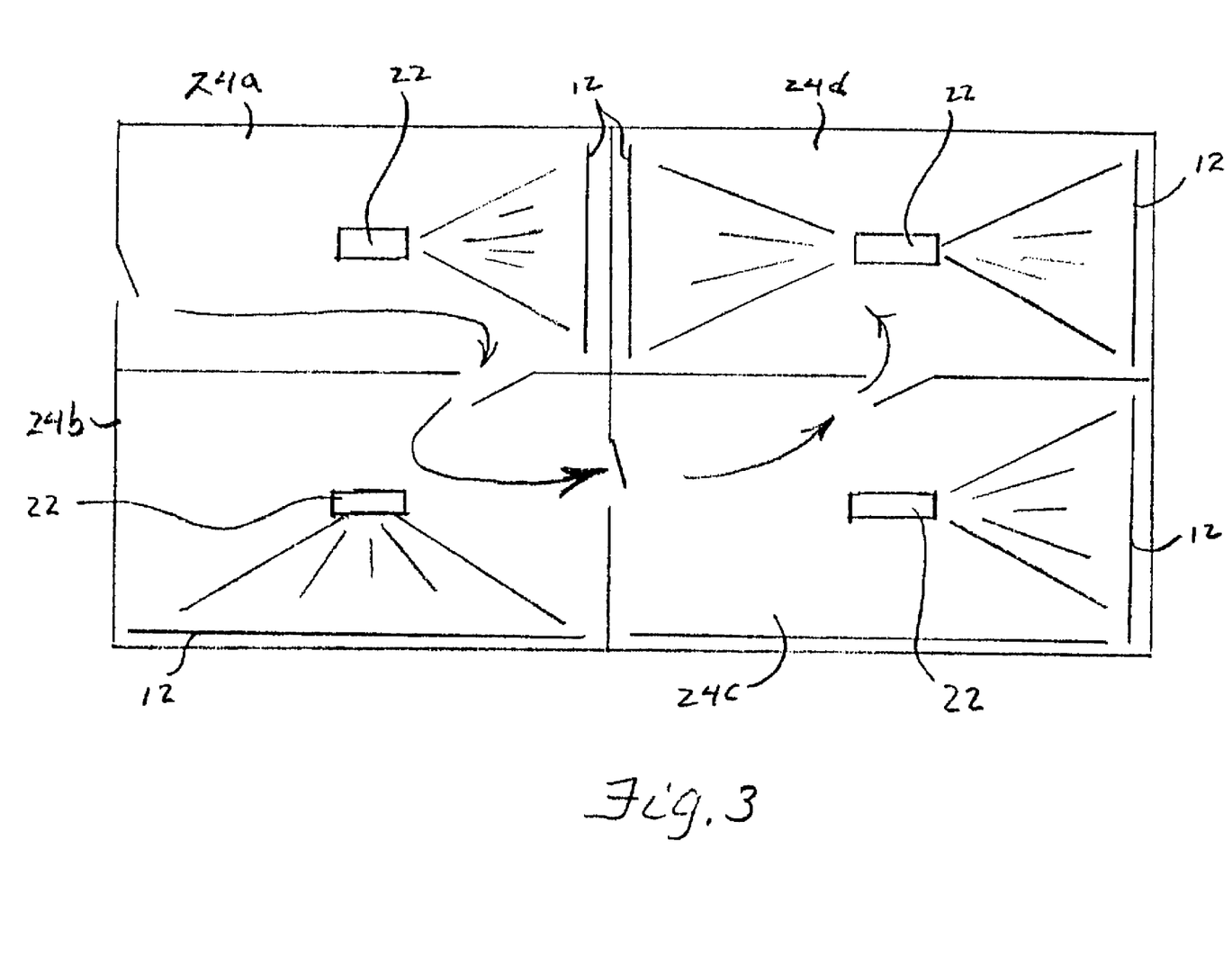
FIG. 3 is a top schematic view of the simulator employing several adjoining rooms as in FIG. 2.
Figure 4:
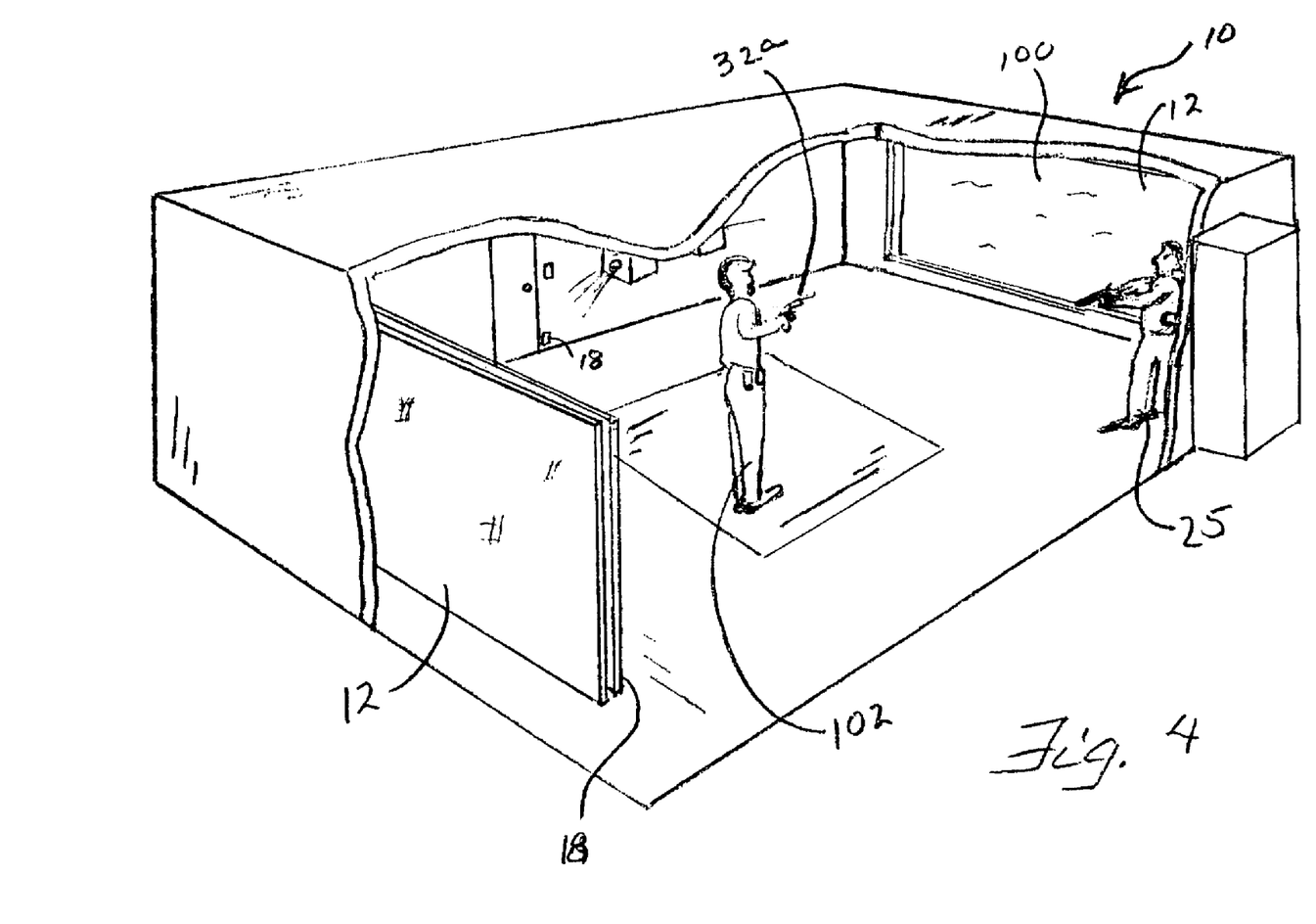
FIG. 4 is a perspective pictorial view of the simulator of FIG. 1 further depicting a physical target introduced into the simulated environment and a simulated firearm associated with the target.
Figure 5:
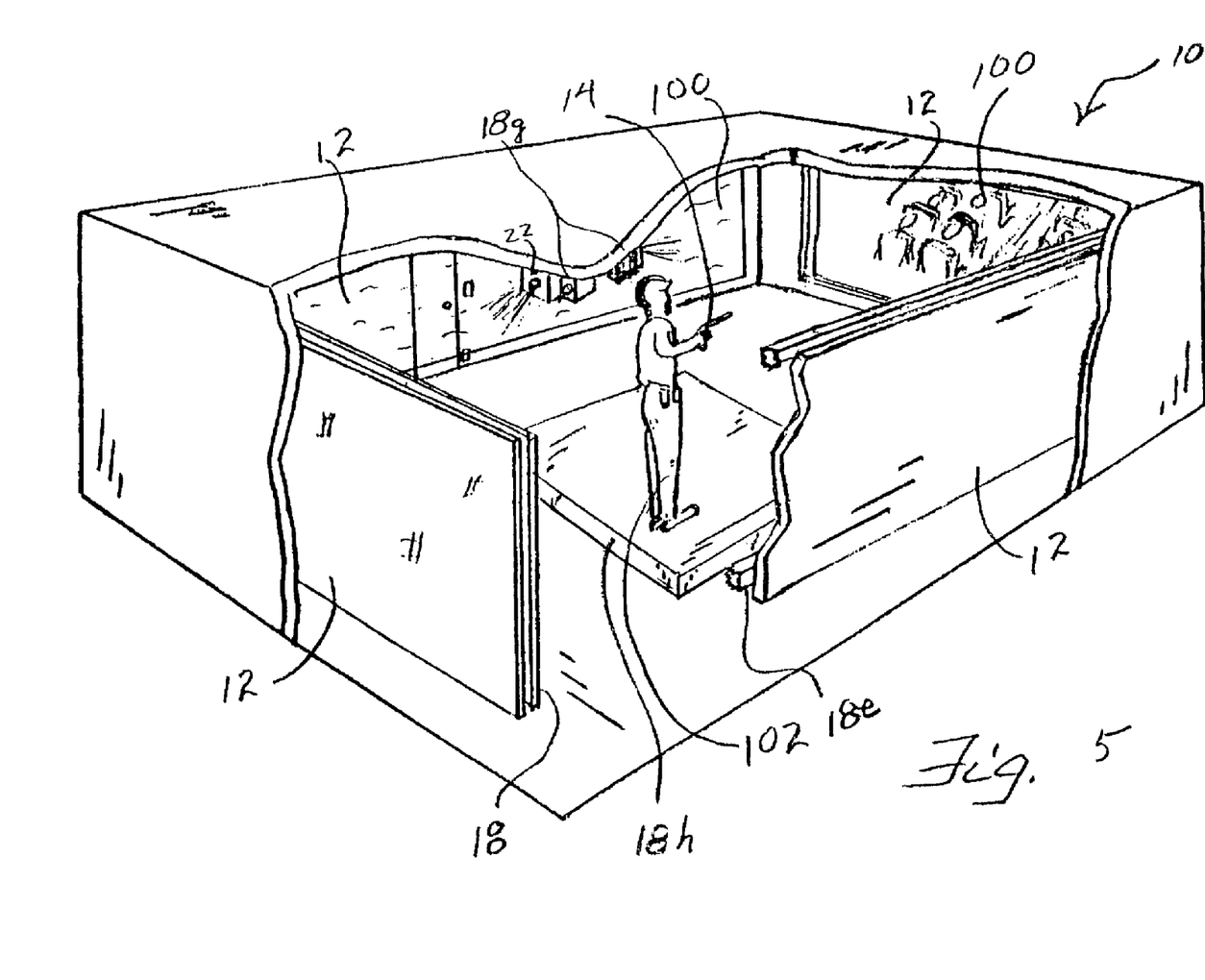
FIG. 5 is a pictorial view of the simulator showing screens all around the participant.
Figure 6:
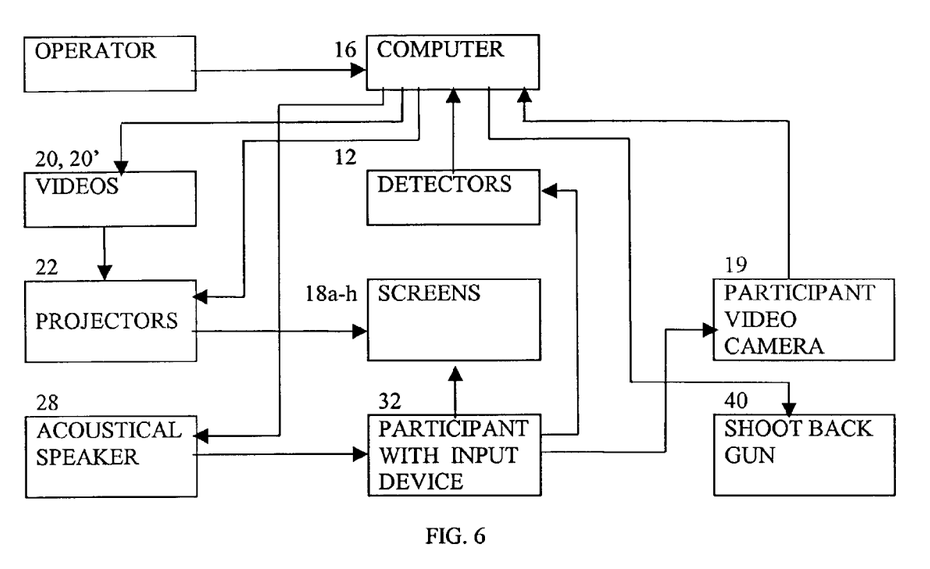
FIG. 6 is a pictorial graphic showing the computer communicating between video projectors, detectors, physical targets and a simulator shoot back gun.
Figure 7:
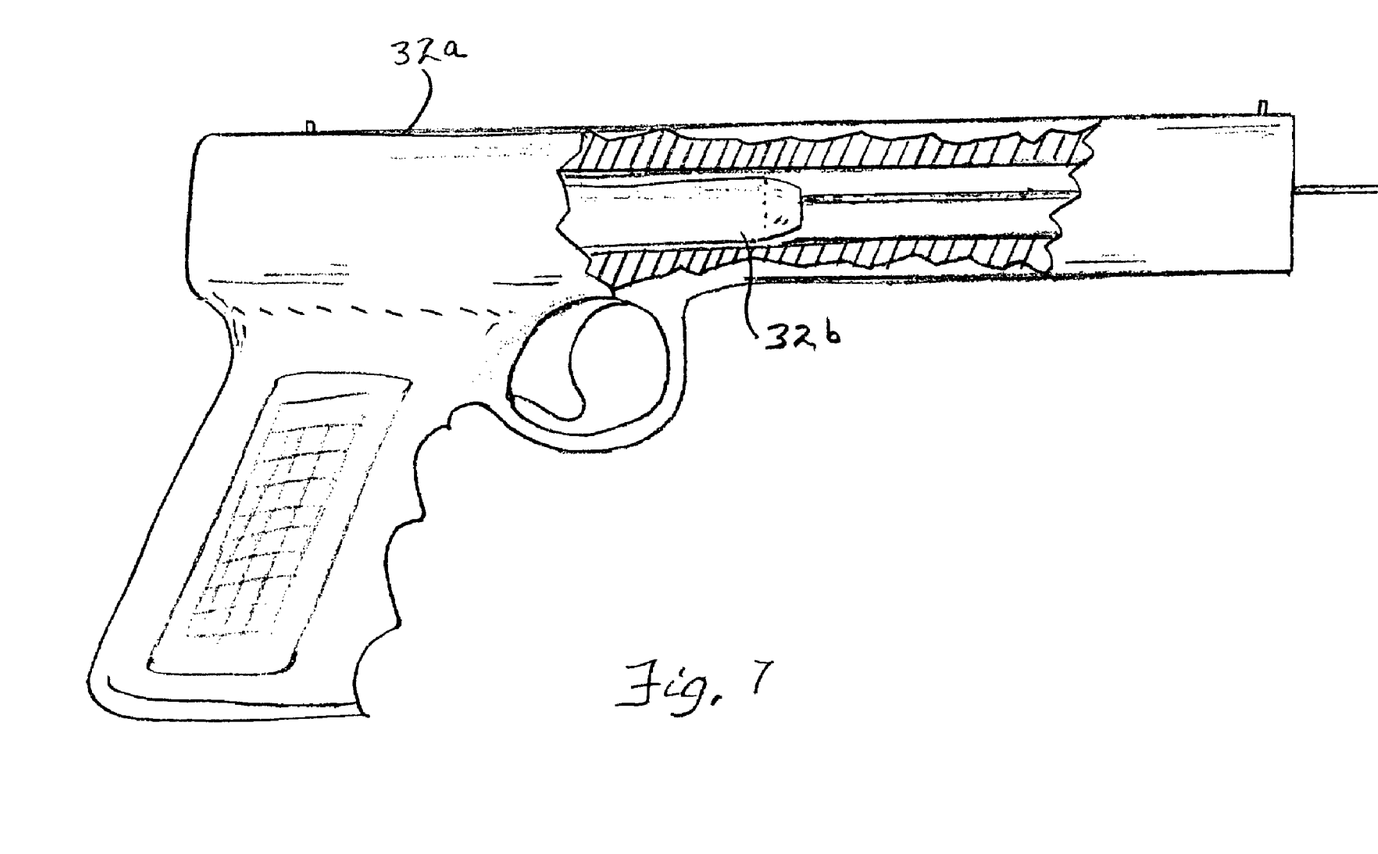
FIG. 7 is a cutaway of a firearm that uses light-emitting bullet substitutes.
Figure 8:
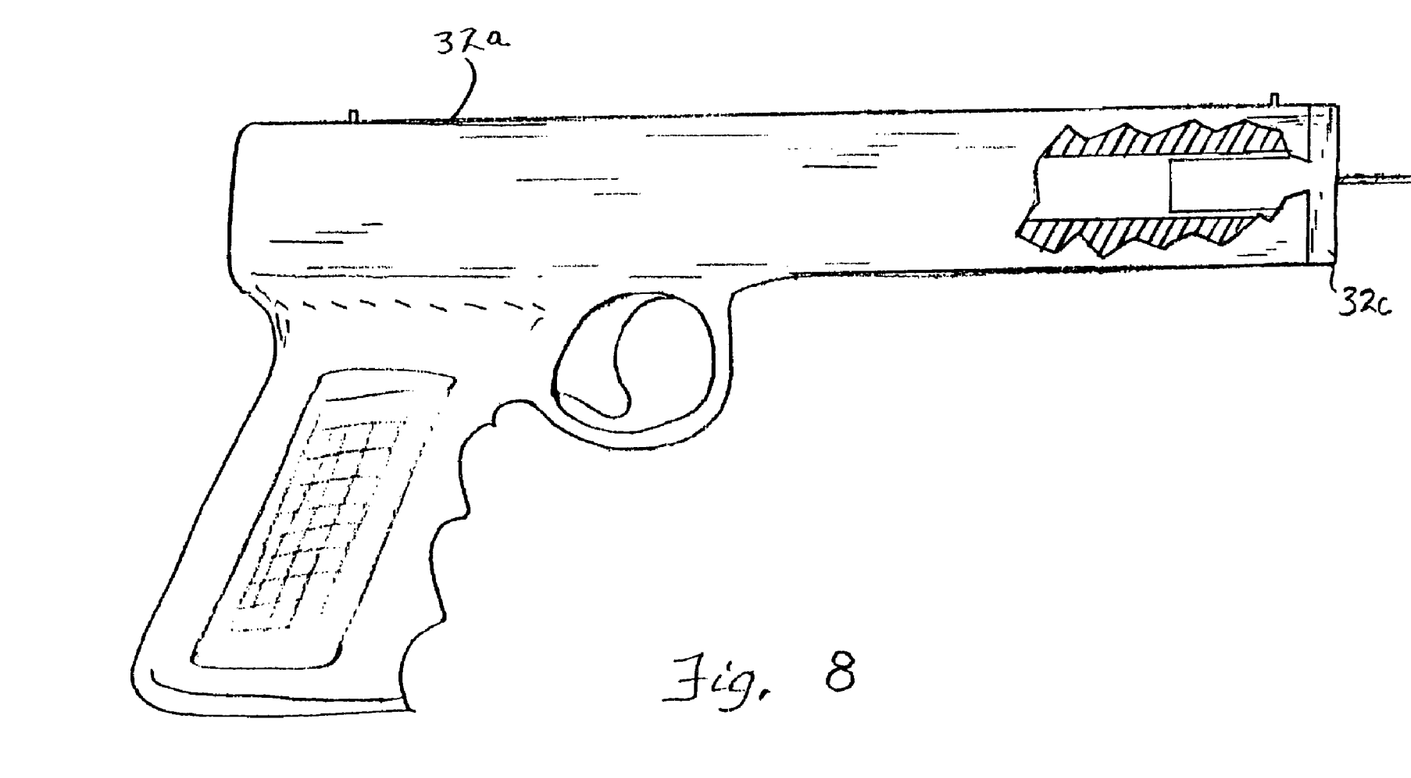
FIG. 8 is a cutaway of a firearm that uses a firearm fitted with a light-emitting device in the barrel of the firearm.
Figure 9:
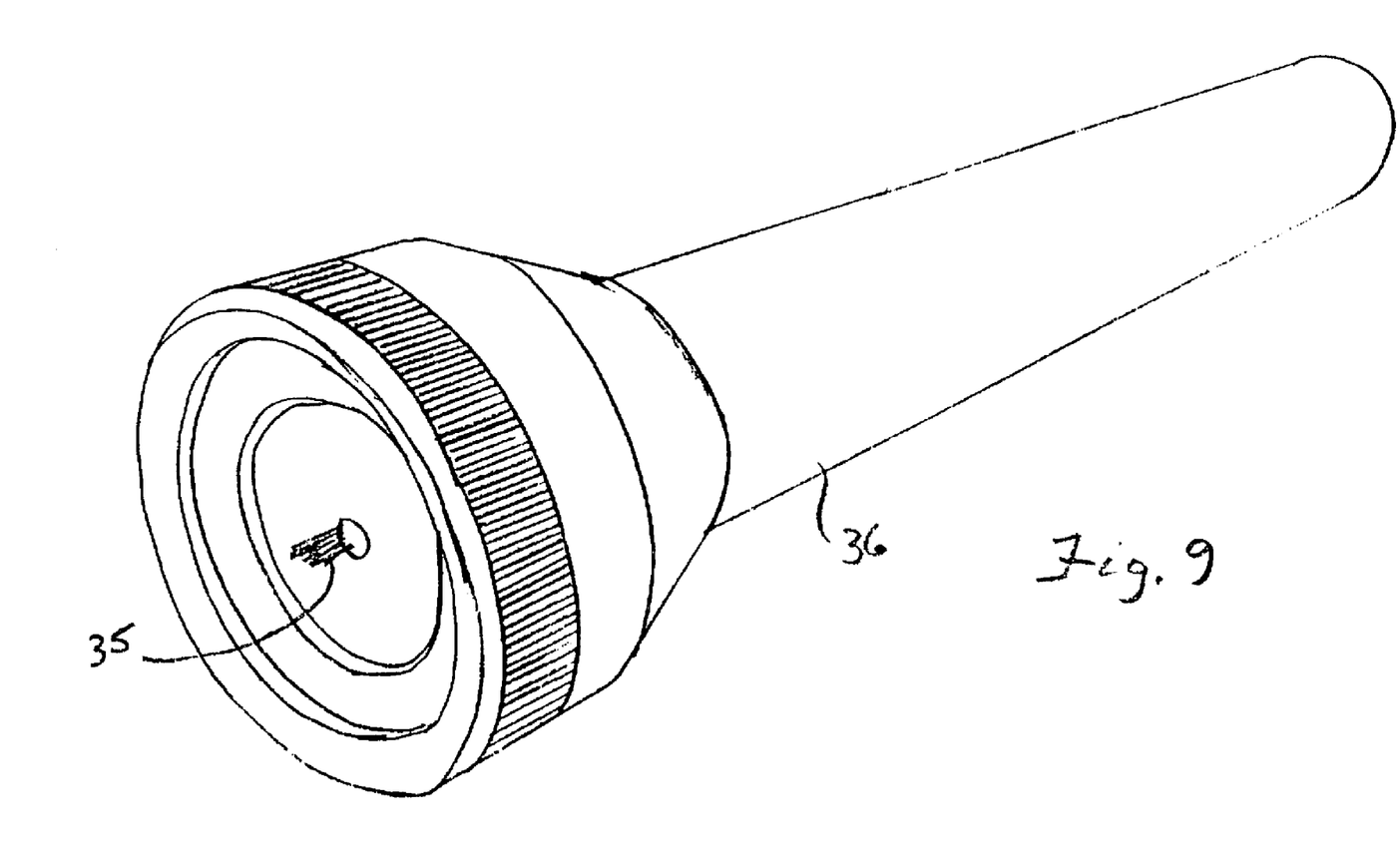
FIG. 9 is a flashlight modified to emit laser light.
Figure 10:
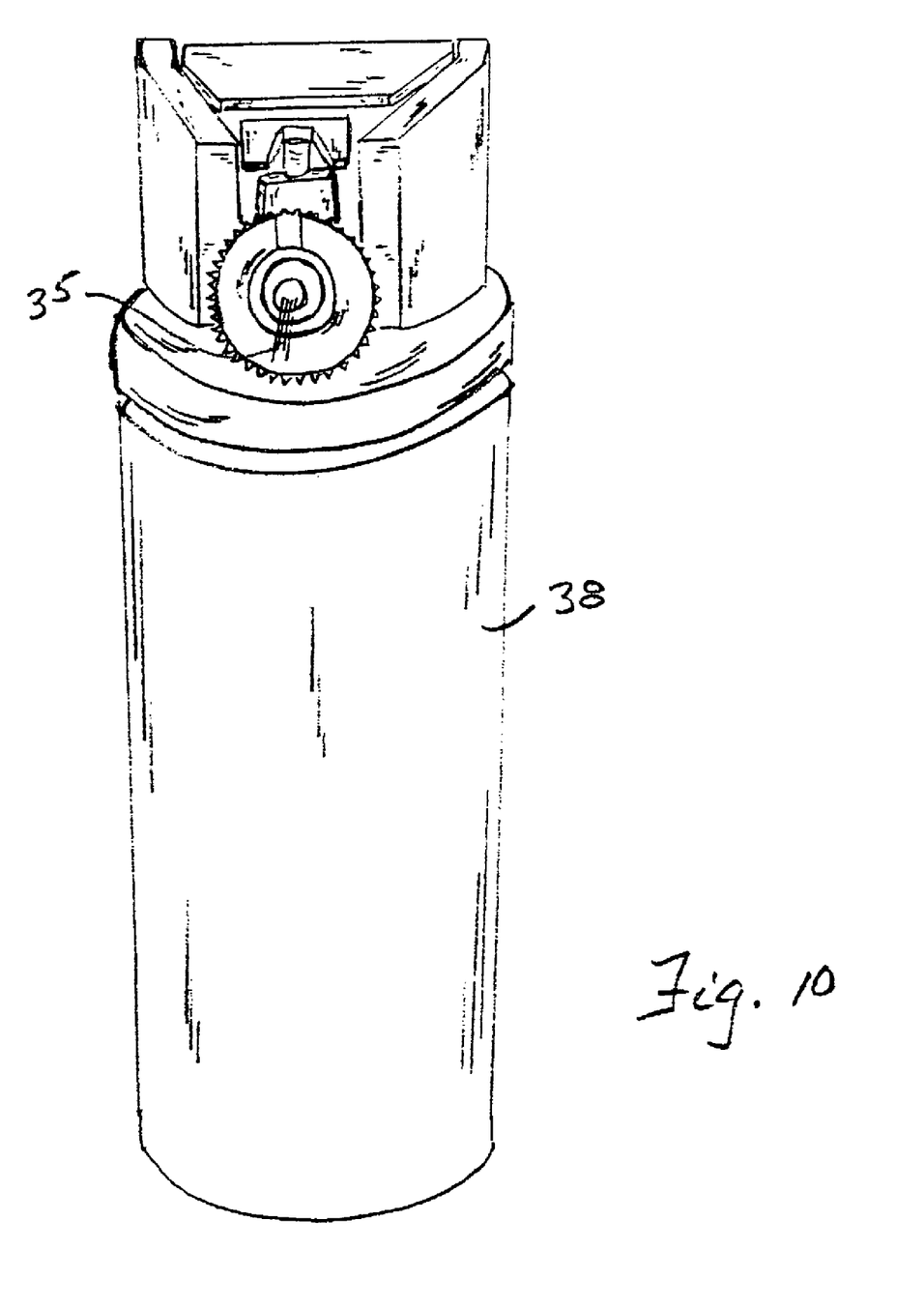
FIG. 10 is a chemical spray container modified to emit laser light instead of chemical.
Figure 11:
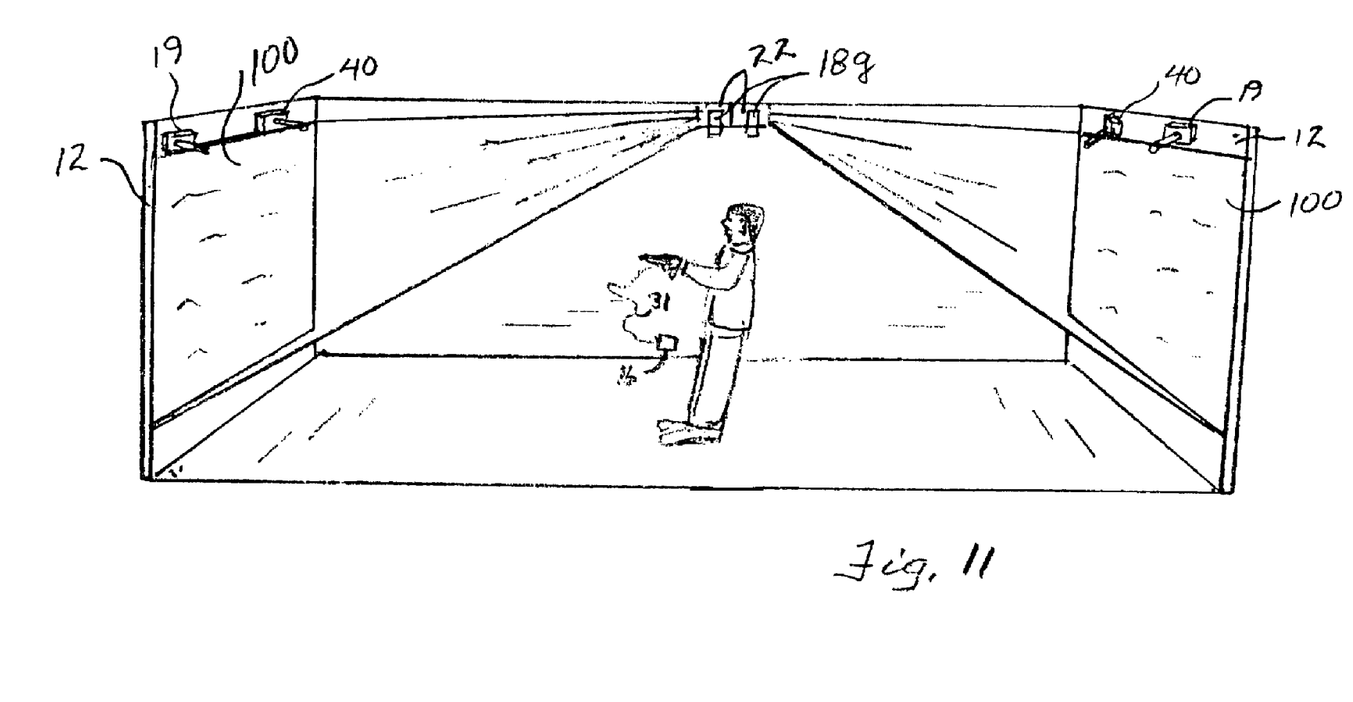
FIG. 11 is a pictorial side view of the simulator showing projectors illuminating fore and aft screens with a participant employing a simulated firearm tethered to a computer by a data wire.
Figure 12:
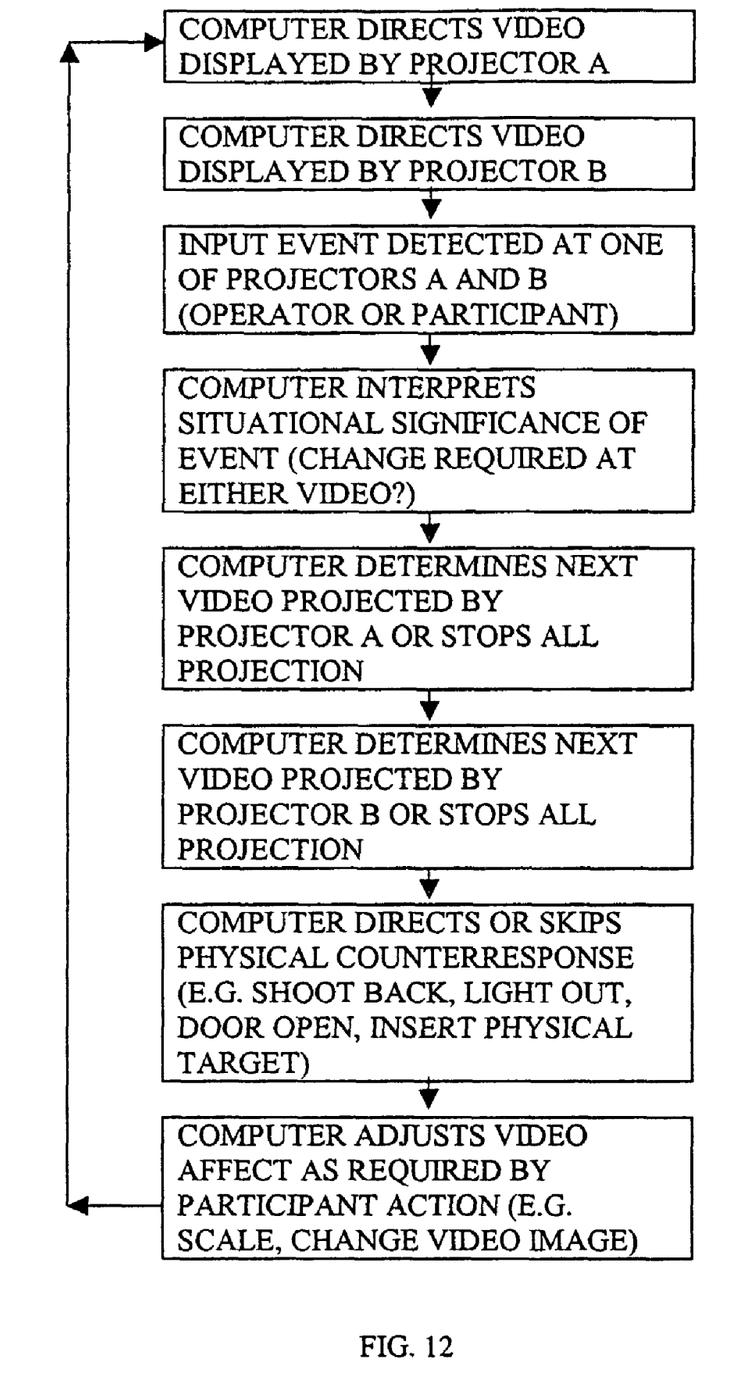
FIG. 12 is a logic flowchart showing the normal operation of the invention.

The present invention comprises a computer-controlled training simulator 10 that displays life-size video images 100 on multiple screens 12 to represent an on-going real-time threat situation to a participant 102 located generally between the screens 12. The videos are coordinated to represent views of a same environment looking in different directions from a participant's perspective. As the represented situation changes, with or without participant involvement, the displayed videos change yet remain different but coordinated, maintaining different directional perspectives of the participant.

Various detectors 18 about the participant 102 and connected to a computer 16 allow the participant to engage the simulated environment by tracking the participant's actions generally, and more particularly his movement and use of his equipment, with the simulated environment changing in real time in response to the participant input through these simulator detectors 18. These various passive detectors about the participant, each in communication with the computer 16, include floor detectors 18a, door movement detectors 18b, room light detectors 18c, microphones 18d, and participant directed light detectors 18e, which directed light is meant to include lasers in simulated chemical spray containers, simulated tasers, flashlights with reflectors and bulbs replaced by small lasers, and various firearms.

A detector 18 may also be provided to detect and locate projectiles, such as actual bullets at the screen. For purposes herein, a projectile means an object discharged in a direction of aim from a mechanical device, such as a bullet discharged from a gun. Likewise, a simulated chemical detector 18f also connected to the computer may be provided to detect simulated chemical spray directed by the participant. All of these participant responses are detected and converted as inputs to the computer, which interprets them and directs a video change, or branch, if any is indicated, consistent with the participant response. A laser or light detector 18g, typically located near the projector, also locates light from a participant input device on the screen.

The simulator includes a database of videos 20, or video segments 20', directed by the computer 16 and displayed by several projectors 22 that enable seamless branching from one video segment 20' to a following video segment 20', which following video segment 20' is selected from several optional video segments 20' in accordance with an action among several possible actions from the participant, realistically representing changing situations. For example, a hostile action by a passenger on a boat, train or airplane may evoke a gunshot from the participant. The computer would change the video sequence to depict a falling hostile passenger and uproar in the boat, train or airplane. Similarly, an accomplice may threaten in the rear of the plane following a first threat of another hostile passenger in the front of an airplane. (The terms "front" and "rear" as used here are meant be interpreted broadly to mean from multiple directions not represented on a single screen. Clearly, this scenario applies also to other situations including where a threat may approach from a side as well as from the rear, requiring the participant to observe a whole environment and not just a front view.) The computer would change the projected video sequences to timely reflect the changing condition on the airplane and the reactions of the participant.

The reaction of the participant will usually include movement, either to turn around, or move behind a shield for protection, or advancement toward or away from a threat or into a new area or room. The simulator may include a footpad 18h that tracks and communicates participant foot movement to the computer, which again adjusts the video sequences to reflect a simulated new position of the participant. In fact the participant remains on the footpad 18g, which absorbs participant motion as a multidirectional treadmill.

The several projectors 22 project a video 20 on several separated screens 12, respectively, about the participant, at least in front of and behind the participant and possibly all around the participant in a full circumferential display. Similarly, the simulation 10 may include separated screens 12 and projectors 22 in a second room 24a adjoining a first room 24b, and other adjoining rooms 24c,d. Acoustical speakers 28 are provided to add sound into the simulated environment coordinated with the projected videos 20. Use of the terms "projector" and "screen" is meant generally to include all possible equipment and technologies employed to produce display of imagery to the participant, including front and back projectors and the various monitor technologies such as plasma, LCD, and CRT displays.

The participant 102 in training employs an input device 30, tethered or untethered by a communication wire 31, corresponding to the situation represented by the simulated environment to interactively communicate with the environment. For ease of movement within a room or rooms 24 representing the simulated environment, the input device 30 is preferably untethered (without data communication wire) between the device and the environment, that is, the room 24 and the detectors 18. Alternatively, the participant may employ a tethered input device (with data communication wire). To make the environment more familiar to the participant, the participant uses a weapon 32 with which is already familiar. The weapon may be a simulated firearm or the participant's own firearm 32a loaded either live ammunition or a light-emitting cartridge 32b instead of a bullet. It may alternatively be loaded with a light-emitting device 32c fitted into the firearm barrel or comprise a simulated firearm adapted to emit light. These light-emitting devices all shoot light at a simulator screen 12. A detector 18e at each screen and connected to the computer 16 detects the participant's actions that are directed at a projected video image 100. When the participant uses his weapon 32, a detector then detects the emitted light (or bullet) and locates its intersection with the screen. The detectors similarly locate light 35 from a flashlight 36 or other light-directing device. Typically, a flashlight 36 is modified to replace its bulb and reflector with a laser emitter. Similarly, a chemical spray container 38 is simulated with a like container fitted with a laser actuated in a same manner as an actual spray container. Likewise, a simulated taser container, bean bag gun, or pepperball gun (all not shown) may be modified to substitute its discharge with a laser.

In situationally following participant actions, the computer 16 is programmed to coordinate seamless projection of different videos 20 to portray a continuous but changing realistic environment, synchronizing the videos 20 on the multiple screens 12 in real time. Selected videos are among an archive of computer-accessible videos maintained in a video database 12. The computer thus receives input from at least one detector at one screen. If the input is among a set of inputs warranting a change in a presently projected video, that is, the input represents an event recognized by the computer 16 of a class requiring a change in situation, the computer 16 directs a change in the video projected at that screen and possibly at one or more other screens consistent with maintaining situational integrity in the simulated environment between the screens. The sound from the speaker also changes under computer control to correspond to changes in the videos projected.

Table 1 shows a list of representative events that the computer might recognize in a typical simulation along with a brief description of the event and a characteristic recorded for that event.

TABLE 1

| EVENT | DESCRIPTION | CHARACTERISTIC RECORDED |
|---|---|---|
| Preamble | The situation or scenario is set up so the participant feeling he or she is actually in the situation. | Participant actions |
| Verbal exchange between simulator and participant | Simulator addresses the participant; the computer recognizes a command from the participant that might direct a change in the video sequence | Participant actions and video sequence |
| Gunshot | Real or simulated bullet is fired at the video screen | 1. Hit/miss/unknown<br>2. Time (or Frame) in video sequence<br>3. Coordinates of bullet on screen<br>4. Shooter/Gun identification |
| Shootback | The simulator fires a projectile at the participant to simulate weapon fire as dictated by the simulated environment. | 1. Time (or Frame) in video sequence<br>2. Participant video |
| Taser | A simulated taser is fired at the video screen | 1. Hit/miss/unknown<br>2. Time (or Frame) in video sequence<br>3. Coordinates of bullet on screen<br>4. Shooter/Gun identification |
| Pepper ball | A simulated pepparball gun is fired at the video screen | 1. Hit/miss/unknown<br>2. Time (or Frame) in video sequence<br>3. Coordinates of bullet on screen<br>4. Shooter/Gun identification |
| Override | Scenario is forced to follow a different timeline/video sequence by an operator | 1. Description of override<br>2. Next timeline/video sequence |
| Response | Period of time over which an appropriate response is expected from the participants | Type of response (verbal, move to protective cover, draw firearm, gunfire) |
| Reaction | Reference time from which to measure reaction time | Time (or frame) in video sequence |
| Trigger | A point in the timeline when some scheduled action must occur, a generalized event used to trigger events at a specific point in the scenario timeline. | Time (or frame) |
| Laser shot | Laser (bullet substitute) fired at the video screen | 1. Hit/miss/unknown<br>2. Time (or Frame) in video sequence<br>3. Coordinates of bullet on screen |

TABLE 1-continued

| EVENT | DESCRIPTION | CHARACTERISTIC RECORDED |
|---|---|---|
| | | 4. Shooter/Gun identification |
| Floor switch | A switch indicating when a participant is on or passes over a position on the floor | On/off |
| Binary switch | A binary switch indicating when a door or light is on or when a participant is on or passes over a position on the floor | On/off |
| Voice Command | A computer-recognizable verbal command from a participant | Command (part of a Command Set) |
| Spray | Simulated chemical sprayed at a screen | 1. Hit/miss/unknown
2. Time (or Frame) in video sequence
3. Coordinates of bullet on screen
4. Shooter/Gun identification |
| Flashlight | Flashlight pointed at the video screen | 1. Hit/miss/unknown
2. Time (or Frame) in video sequence
3. Coordinates of bullet on screen
4. Shooter/Gun identification |

Table 2 shows a representative set of actions the computer 16 may take in response to detected input from the participant.

TABLE 2

| ACTION | DESCRIPTION |
|---|---|
| Branch | Branch to a different timeline by changing video sequence |
| Shoot back | Firing of the simulator shoot back gun |
| Video affect | Change the appearance of the displayed video, such as when a flashlight is pointed at the video |
| Target | Activation of a physical target |
| Door | Opening or closing of a door |
| Light | Turning on or off a light |
| Video scale | Change video sequence or scale the appearance of the displayed video when the participant moves on the floor. |

A firearm 14 that uses bullet substitutes 15 is also provided in the simulator 10. Thus, as part of the reaction by the simulator 10 to a participant's action the computer 16 may direct a gun 40 to shoot a projectile at the participant. A computer-controlled physical target 25 may also be introduced into the environment.

Typically, a user may make many insignificant responses to the environment. In interpreting the user input, the computer compares the input against a selection of inputs that require a change in video. It is only upon identifying one of these selected inputs that the computer directs a branch to a different video in the projector corresponding to the participant action. If the event is one that also requires a change in another projector video, a notice event, that other projector video is also changed to maintain a consistent continuing scenario. The computer 16 records participant actions through camera 19 in response to the simulated environment as participant videos, which videos then can be reprojected in synchronization with a previously projected video when the participant videos were recorded.

Having described the invention, what is claimed is as follows:

1. A training simulator in which a participant engages in an environment simulated through projected videos about the participant, comprising,
    a plurality of videos;
    a plurality of screens, including at least a screen in front of the participant and behind the participant, wherein the simulator is adapted such that the participant can move about the simulator as part of his training;
    a plurality of projectors adapted to project the videos on the respective screens presenting life-size displays mutually coordinated to represent views of a same environment from a participant's perspective, each screen representing the participant's view looking in a different direction, including in front of and behind the participant;
    a detector adapted to detect participant actions within the training simulator;
    a computer directing and controlling videos projected by the projectors, the videos mutually time-synchronized and situationally coordinated, the computer receiving input from the detector and programmed to logically branch as a result of user input through the detector to direct a different video from the database to at least one of the projectors, representing situational changes caused by participant action;
    a weapon or simulated weapon as a participant input device employable by the participant and retained by the participant during participant's engagement with the simulated environment, shooting of the weapon or simulated weapon causing it to emit light therein in response to a threat situation presented to the participant on a screen, which light is detected within the simulated environment, wherein the displayed videos at least in part present said threat situation to the participant and wherein said detector further comprises a light detector located at least one screen configured to detect light emitted from the weapon or simulated weapon directed at said screen;
    and, a microphone connected to the computer and adapted to detect verbal input from the participant, the computer interpreting said verbal input as commands integrated as a response of the participant to the simulated environment.

2. The training simulator of claim 1 further comprising a detector connected to the computer and adapted to detect light emitted from a simulated chemical spray device directed by the participant.

3. The training simulator of claim 1 further comprising an acoustical speaker introducing sound into the simulated environment coordinated with the projected videos.

4. The training simulator of claim 1 further comprising a physical target introduced into the environment on computer command spaced apart from the screens.

5. The training simulator of claim 1 in which said light from the weapon or simulated weapon is detectable effectively as the light intersects a screen by detectors at the screen.

6. The training simulator of claim 5 in which said weapon comprises a firearm loaded with nonprojectile bullets configured to emit light from the firearm.

7. A training simulator in which a participant engages in an environment simulated through projected videos about the participant, comprising,
   a plurality of videos;
   a plurality of screens, including at least a screen in front of the participant and behind the participant, wherein the simulator is adapted such that the participant can move about the simulator as part of his training;
   a plurality of projectors adapted to project the videos on the respective screens presenting life-size displays mutually coordinated to represent views of a same environment from a participant's perspective, each screen representing the participant's view looking in a different direction, including in front of and behind the participant;
   a detector adapted to detect participant actions within the training simulator;
   a computer directing and controlling videos projected by the projectors, the videos mutually time-synchronized and situationally coordinated, the computer receiving input from the detector and programmed to logically branch as a result of user input through the detector to direct a different video from the database to at least one of the projectors, representing situational changes caused by participant action;
   a weapon as a participant input device employable by the participant and retained by the participant during participant's engagement with the simulated environment, shooting of the weapon detected as a response to a threat situation presented to the participant on a screen;
   wherein the displayed videos at least in part present said threat situation to the participant and wherein said detector is located at least one screen and configured to detect a bullet discharged from the weapon directed at said screen, in which said weapon comprises a participant's own firearm loaded with live ammunition;
   and, a microphone connected to the computer and adapted to detect verbal input from the participant, the computer interpreting said verbal input as commands integrated as a response of the participant to the simulated environment.

8. The training simulator of claim 1 further comprising a gun adapted to shoot a projectile at the participant in response to a participant action or by direction of a simulator operator.

9. A training simulator in which a participant engages in an environment simulated through projected videos about the participant, comprising,
   a database of said videos;
   a plurality of screens, including at least a screen in front of the participant and behind the participant, wherein the simulator is adapted such that the participant can move about the simulator as part of his training;
   a plurality of projectors adapted to project said videos on the respective screens presenting life-size displays mutually coordinated to represent views of a same environment from a participant's perspective, each screen representing the participant's view looking in a different direction, including in front of and behind the participant;
   a plurality of rooms with at least one of said screens and at least one of said projectors located in each of at least two of said plurality of rooms, the simulator adapted to accommodate the participant moving between said rooms with the videos branching to adapt to the changing location of the participant;
   a detector adapted to detect participant actions within the training simulator;
   a computer directing and controlling videos projected by the projectors, the videos mutually time-synchronized and situationally coordinated, the computer receiving input from the detector and programmed to logically branch as a result of user input through the detector to direct a different video from the database to at least one of the projectors, representing situational changes caused by participant action;
   a weapon or simulated weapon as a participant input device employable by the participant and retained by the participant during participant's engagement with the simulated environment, shooting of the weapon or simulated weapon causing it to emit light therein in response to a threat situation presented to the participant on a screen, which light is detected within the simulated environment;
   wherein the displayed videos at least in part present said threat situation to the participant and wherein said detector further comprises a light detector located at least one screen and configured to detect light emitted from the weapon or simulated weapon directed at said screen;
   and, a microphone connected to the computer and adapted to detect verbal input from the participant, the computer interpreting said verbal input as commands integrated as a response of the participant to the simulated environment.

10. The training simulator of claim 1 further comprising a device selected from the group consisting of a laser, a simulated firearm, a simulated taser, and a simulated flashlight, each of which comprise a light-emitting device detectable by said detector.

11. The training simulator of claim 1 further comprising life size displays 360 degrees around the participant representing a full circumferential life size scenario.

* * * * *